(12) United States Patent
Celasun et al.

(10) Patent No.: US 11,522,187 B2
(45) Date of Patent: Dec. 6, 2022

(54) POSITIVE ELECTRODE MATERIAL FOR RECHARGEABLE LITHIUM ION BATTERIES

(71) Applicants: UMICORE, Brussels (BE); UMICORE KOREA LTD., Cheonan-si (KR)

(72) Inventors: Yagmur Celasun, Paris (FR); Jens Paulsen, Cheonan-si (KR); Shinichi Kumakura, Cheonan-si (KR); Areum Park, Cheonan-si (KR); Jukyoung Lee, Cheonan-si (KR); Taehyeon Yang, Cheonan-si (KR)

(73) Assignees: UMICORE, Brussels (BE); UMICORE KOREA LTD., Cheonan-si (KR)

(*) Notice: Subject to any disclaimer, the term of this patent is extended or adjusted under 35 U.S.C. 154(b) by 251 days.

(21) Appl. No.: 16/956,025

(22) PCT Filed: Dec. 4, 2018

(86) PCT No.: PCT/EP2018/083406
§ 371 (c)(1),
(2) Date: Jun. 19, 2020

(87) PCT Pub. No.: WO2019/120973
PCT Pub. Date: Jun. 27, 2019

(65) Prior Publication Data
US 2021/0119204 A1    Apr. 22, 2021

(30) Foreign Application Priority Data

Dec. 22, 2017 (EP) .................................. 17209955

(51) Int. Cl.
*H01M 4/525* (2010.01)
*H01M 4/505* (2010.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
None
See application file for complete search history.

(56) References Cited

U.S. PATENT DOCUMENTS

2014/0205898 A1* 7/2014 Lee .................... H01M 4/1391
427/126.6
2017/0133668 A1   5/2017 Kim et al.
(Continued)

FOREIGN PATENT DOCUMENTS

CN    107408667 A    11/2017
EP      3249723 A1    11/2017
(Continued)

OTHER PUBLICATIONS

"OLME An HKEX Company: Special Contract Rules for Copper Grade A", The London Metal Exchange, accessed at: https://www.inducorp.co.in/assets/pdf/copper.pdf, 2016, 4 pages.
(Continued)

*Primary Examiner* — Carlos Barcena
(74) *Attorney, Agent, or Firm* — NK Patent Law (57) ABSTRACT

The invention provides a positive electrode active material for a lithium ion battery, comprising a lithium transition metal-based oxide powder, the powder comprising single crystal monolithic particles comprising Ni and Co and having a general formula $Li_{1+a}((Ni_z(Ni_{1/2}Mn_{1/2})_yCo_x)_{1-k}A_k)_{1-a}O_2$, wherein A is a dopant, $-0.02<a\leq0.06$, $0.10\leq x\leq0.35$, $0\leq z\leq0.90$, $x+y+z=1$ and $k\leq0.01$, the particles having a cobalt concentration gradient wherein the particle surface has a higher Co content than the particle center.

17 Claims, 5 Drawing Sheets

(51) Int. Cl.
*H01M 4/131* (2010.01)
*H01M 4/1391* (2010.01)
*H01M 4/04* (2006.01)
*H01M 10/0525* (2010.01)

(52) U.S. Cl.
CPC ......... *H01M 4/1391* (2013.01); *H01M 4/505* (2013.01); *H01M 10/0525* (2013.01)

(56) References Cited

U.S. PATENT DOCUMENTS

| 2018/0013129 A1 | 1/2018 | Lee et al. |
| 2018/0351174 A1 | 12/2018 | Paulsen et al. |

FOREIGN PATENT DOCUMENTS

| JP | 2006054159 A | 2/2006 |
| JP | 2009544565 A | 12/2009 |
| WO | 2013002559 A2 | 1/2013 |
| WO | 2016116867 A1 | 7/2016 |
| WO | 2017042654 A1 | 3/2017 |
| WO | 2017095153 A | 6/2017 |

OTHER PUBLICATIONS

ISA/EP; International Search Report and Written Opinion for International Patent Application No. PCT/EP2018/083406 dated Mar. 15, 2019, 11 pages.
WIPO; International Preliminary Report on Patentability for International Patent Application No. PCT/EP2018/083406 dated Jan. 8, 2020, 8 pages.
Hyung-Joo Noh et al., "Formation of a Continuous Solid-Solution Particle and its Application to Rechargeable Lithium Batteries", Advanced Functional Materials, vol. 23, No. 18, Feb. 25, 2013, pp. 1028-1036.
"International Standard ISO 2533: Standard Atmosphere", International Organization for Standardization, Ref No. ISO 2533-1975 (E), May 15, 1975, 15 pages.
USPTO; Non-Final Office Action for U.S. Appl. No. 16/909,179 dated May 16, 2022, 5 pages.

* cited by examiner

POSITIVE ELECTRODE MATERIAL FOR RECHARGEABLE LITHIUM ION BATTERIES

CROSS-REFERENCE TO RELATED APPLICATIONS

This application is a U.S. National Stage application of International Patent Application No. PCT/EP2018/083406, filed on Dec. 4, 2018, which claims the benefit of European Patent Application No. 17209955.8, filed on Dec. 22, 2017.

TECHNICAL FIELD AND BACKGROUND

This invention relates to a lithium transition metal oxide material with monolithic morphology that can be applied as a positive electrode material for rechargeable lithium ion batteries. More particularly, this material has a gradient of cobalt concentration from the surface to the core. The positive electrode material enhances the battery performances, such as capacity, cycle stability and rate capability. Moreover, the material can be used in solid state lithium ion batteries or non-aqueous lithium ion batteries at a high voltage due to its special morphology.

Rechargeable lithium ion batteries (LIBs) are currently used for laptops, cell phones, cameras and a variety of other electronic devices due to their high volumetric and gravimetric energy density, and long cycle life. Furthermore, to meet the needs for large batteries for electric vehicles (EVs) and hybrid electric vehicles (HEVs), higher energy density batteries are required. One way to increase the energy density of a battery is by applying a higher working voltage. However, the organic liquid electrolyte used in conventional lithium ion batteries decomposes during cycling at high voltage and forms side products. Besides of the stability problem, electrolytes contain flammable solvents, which can cause thermal runaway at high charging levels. As a result, serious safety issues such as high possibility of electrolyte leakage, overheating and burning can occur. Considering future EV and HEV applications, safety is one of the top concerns.

Solid electrolytes, replacing the flammable liquid-organic electrolytes, have opened the field of solid state batteries (SSBs). Solid electrolytes not only bring high safety, but also it can be expected that they offer excellent cycle stability. These properties make them also attractive for high voltage applications. Previously SSB technology was driven by thin film battery technologies for portable applications. In general, layered oxide materials as positive electrode materials, especially $LiCoO_2$ (LCO), are preferred e.g. for thin film batteries. An LCO possesses sufficient high theoretical capacity with good thermal stability. However, due to resource scarcity causing high prices of cobalt (Co) and environmental issues, new positive electrode materials possessing a stable 2D layer structure with high theoretical capacity are developped. Using LCO as starting point, by metal substitution, i.e. replacing Co by other transition metals, $LiNi_xMn_yCo_zO_2$ (NMC) and $LiNi_xCo_yAl_yO_2$ (NCA) have been discovered by adjusting the composition of ternary layer oxide materials $Li_{1+a}M_{1-a}O_2$, where M is a mixture of nickel (Ni), cobalt (Co), manganese (Mn) or aluminum (Al), with a being typically near zero. These materials are popular since the combination of Ni, Mn, Co and Al offers advantages based on the fact that Ni delivers high capacity while Mn provides a good cyclic performance. Moreover, Co supports the layered crystal structure of NMC so that Li ion can be quickly transported. Al doping is also known as a way to improve safety.

In conventional LIBs, a polycrystalline NMC having open interconnected porosities is preferred because the liquid electrolyte can easily penetrate into the porous structure. This is useful since the much higher lithium conductivity of the electrolyte creates "highways" for a fast lithium diffusion in to and out of the particles. However, a porous structure is not beneficial for SSBs since a solid electrolyte cannot enter into the pores. Therefore, a non-porous morphology is needed. Furthermore, SSBs requires a good interfacial contact between a solid electrolyte and the positive electrode particles, which can be achieved especially when the particles have for example a spherical or near spherical morphology. This contact is then achieved by pressing a solid electrolyte onto a powderous positive electrode material. It follows that the positive electrode powder is required to be mechanically robust. If polycrystalline (porous) NMC is used in SSBs, the interfacial contact between solids may be damaged or cracks are formed when compressing the electrode as part of the battery manufacturing process. Cracking is also a more general concern: during charge-discharge, particles experience volume changes induced by strain, as described in A. C. Luntz et al in J. Phys. Chem. Lett., 2015, 6 (22). This volume change can delaminate the interface between electrode and electrolyte, resulting in additional cracks. The peeling and cracking leads to disconnection of lithium ionic pathways, and consequently causes a rapid capacity loss. These problems are less severe in the case of conventional batteries because they contain liquid electrolytes and somehow flexible electrodes, and therefore particles can be still electrically active after cracking, since the system is more tolerant to this deformation. But when applying high voltage cycling this flexibility might not be sufficient to absorb the repeated volume changes. Similarly, since SSBs have no buffer and a binder to withstand such cracks, it would be a big problem in such a real battery.

In US2017/133668 A1 a polycrystalline positive electrode material having a core part and a surface part is disclosed, where an amount of manganese in the core part and the surface part is higher than 25 mol %, and amounts of nickel and cobalt in the positive electrode active material vary such that a concentration gradient of the nickel and the cobalt in a direction from the core part to the surface part is present in the positive electrode active material.

CN107408667 provides a method to make a positive electrode active material which includes a core, a shell disposed around the core, and a buffer layer between the core and the shell, the buffer layer including pores and a three-dimensional network structure connecting the core and the shell, wherein the core, the shell, and the three-dimensional network structure of the buffer layer each independently include a lithium nickel manganese cobalt-based composite metal oxide and at least one metallic element of the nickel, the manganese, and the cobalt has a concentration gradient that gradually changes in any one region of the core, the shell, and the entire positive electrode active material.

WO2017/042654 discloses a method for manufacturing a positive electrode material having a general formula $Li_{1-a'}((Ni_z (Ni_{1/2} Mn_{1/2})_y Co_x)_{1-k} A_k)_{1+a} O_2$, wherein x+y+z=1, 0.1≤x≤0.4, 0.25≤z≤0.55, A is a dopant, 0≤k≤0.1, and 0.01≤a'≤0.10, by a multiple sintering step process.

It is an object of the present invention to provide a novel positive electrode material that is especially adapted for SSBs or non-aqueous batteries functioning at high voltage without having the disadvantages of known monolithic LCO and polycrystalline NMC materials, and in particular being mechanically robust to withstand continuous volume changes and crack formation.

SUMMARY

Viewed from a first aspect, the invention can provide a positive electrode active material for a lithium ion battery, comprising a lithium transition metal-based oxide powder, the powder comprising single crystal monolithic particles comprising Ni and Co and having a general formula $Li_{1+a}((Ni_z(Ni_{1/2}Mn_{1/2})_y Co_x)_{1-k} A_k)_{1-a} O_2$, wherein A is a dopant, $-0.02<a\leq0.06$, $0.10\leq x\leq0.35$, $0\leq z\leq0.90$, $x+y+z=1$ and $k\leq0.01$, the particles having a cobalt concentration gradient wherein the particle surface has a higher Co content than the particle center and wherein either
when Mn is present, the ratio between the Co/Mn molar ratio at the particle surface and the Co/Mn molar ratio at a distance d from the surface is between 1.1 and 1.3, whereby d=¼ of the distance from the particle surface to the particle center, or
when Mn is absent, the ratio between C(4)/C(3) is between 1.1 and 1.3, wherein C(4) is the ratio of the molar concentration between Co at the particle surface and the molar concentration of Co at the particle center, and wherein C(3) is the ratio between a) the Co molar concentration at ¾ distance from the particle surface to the particle center and b) the molar concentration of Co at the particle center. In one embodiment Mn is absent and the general formula is $Li_{1+a'}((Ni_{z'}Co_{x'})_{1-k'}A_{k'})_{1-a'} O_2$, wherein A is a dopant, $-0.02<a\leq0.06$, $0.10\leq x'\leq0.35$, $0.70\leq z'\leq0.90$, $x'+z'=1$ and k'0.01. In an embodiment 000.67, in another embodiment y>0 and (z+y/2)>x. In still another embodiment y>0 and z>y/2. In a further embodiment y>0, z≥0.35 and $-0.012\leq a\leq 0.010$. The dopant A is either one or more of Al, Ca, W, B, Si, Ti, Mg and Zr. The advantage of having dopants can be either improvement of structural and thermal stability or enhancement of the lithium ionic conductivity. It might also be that oxygen in the general formula is partly replaced by S, F or N.

The positive electrode active material may be a powder having a particle size distribution with D50<10 μm, preferably less than 8 μm and more preferably between 2 and 5 μm. In an embodiment—when Mn is present—the ratio between the Co/Mn molar ratio at the particle surface and the Co/Mn molar ratio at the particle center is between 1.4 and 1.5. In another embodiment, the cobalt concentration gradient varies continuously from the surface to the center of the particles. The powder may consist of particles having a morphology with multiple flat surfaces and an aspect ratio of at least 0.8. Such a morphology is (quasi) spherical or oval. The surface layer of the electrode active material may comprise $LiCoO_2$, where it may also be that Co is partly replaced by the dopant A. Furthermore the particles constituting the powder may be provided with a coating comprising either one or both of $LiNaSO_4$ and $Al_2O_3$.

Viewed from a second aspect, the invention can provide a method for manufacturing the powderous positive electrode material compound described above, comprising Ni and Co and having a general formula $Li_{1+a}((Ni_z(Ni_{1/2}Mn_{1/2})_y Co_x)_{1-k} A_k)_{1-a} O_2$, wherein A is a dopant, $-0.02<a\leq0.06$, $0.10\leq x\leq0.35$, $0\leq z\leq0.90$, $x+y+z=1$ and $k\leq0.01$, comprising the steps of:
providing a first precursor comprising A, Ni and Co, and Mn if present in the powderous positive electrode material, the precursor consisting of particles having a particle size distribution with a D50<10 μm,
mixing the first precursor with either one of LiOH, $Li_2O$, $Li_2CO_3$ and $LiOH\cdot H_2O$, thereby obtaining a first mixture, whereby the Li to transition metal ratio LM1 in the first mixture is between 0.60 and <1.00,
sintering the first mixture in an oxidizing atmosphere at a temperature between 700° C. and 900° C., for a time between 6 and 36 hrs, thereby obtaining a first intermediate product,
mixing the first intermediate product with either one of LiOH, $Li_2O$, $Li_2CO_3$ and $LiOH\cdot H_2O$ hereby obtaining a second mixture, whereby the Li to transition metal ratio in the second mixture LM2≥0.90,
sintering the second mixture in an oxidizing atmosphere at a temperature between (950−(155.56*z)°) C. and (1050−(155.56*z)°) C., for a time between 6 and 36 hrs,
milling the sintered second mixture whereby the sintered second mixture particles are separated in solitary primary particles,
providing a Co-based precursor and optionally a Li-based precursor, and mixing said precursors with the sintered and milled second mixture, thereby obtaining a third mixture having a Li to transition metal ratio in the third mixture LM3 with −0.107*z+1.0183–0.107*z+1.098,
sintering the third mixture in an oxidizing atmosphere at a temperature between 700° C. and 800° C., for a time between 6 and 36 hrs.

In one embodiment y>0, z≥0.35 and $-0.012\leq a\leq 0.010$, and LM1 is between 0.60 and 0.95, LM2≥LM1 or even LM2>LM1, and LM3≥LM1, and the second sintering temperature may be between 895° C. and 995° C. Also in this embodiment it may be that LM3=LM2, meaning that the Co molar content in the Co-based precursor and the Li molar content in the Li-based precursor are equal, whereby both molar contents are expressed versus the total metal content—except Li—in the second mixture. Hereto, it may be that between 2 and 10 mol % of Co is added in the Co-based precursor. In another embodiment the milling step is applied to break agglomerated powder from the $2^{nd}$ sintering into separate particles in a ball mill equipment.

In a further embodiment the method described before comprises the subsequent steps of:
providing an inorganic oxidizing chemical compound,
providing a chemical that is a Li-acceptor,
mixing the sintered third mixture, the oxidizing compound and the Li-acceptor, thereby obtaining a fourth mixture, and
heating the fourth mixture at a temperature between 300 and 800° C. in an oxygen comprising atmosphere. In this embodiment, it may be that both the inorganic oxidizing chemical compound and the Li-acceptor chemical are the same compound, being either one of $Li_2S_2O_8$, $H_2S_2O_8$ and $Na_2S_2O_8$, and the heating temperature of the fourth mixture is between 350 and 450° C. It may also be that a nanosized $Al_2O_3$ powder is provided as a further Li-acceptor chemical.

Viewed from a third aspect, the invention can provide the use of the powderous positive electrode material in either a solid state lithium ion battery, or in a lithium ion battery provided with a liquid electrolyte, and being cycled up to a voltage or at least 4.35V.

BRIEF DESCRIPTION OF THE FIGURES

FIG. 1. Discharge capacity of EEX1.1 and EEX1.2 as a function of cycle number, FIG. 2. Cross-sectional SEM images of EEX1.1 and EEX1.2 before and after cycling, FIG. 3. SEM image of CEX1.1, FIG. 4. SEM image of EX1.1, FIG. 5. XRD pattern of EX1.1, FIG. 6.1. EDS line profile of the Ni, Mn and Co (mol %) of EX1.1, FIG. 6.2. Cross-sectional SEM image of EX1.1, with selected positions (D0, D1, D2, D3, and D4) for EDS analysis, FIG. 6.3. EDS profiles of the Co/Mn molar ratio (mol/mol) of EX1.1 at selected positions, FIG. 7.1. Full cell testing results of EX2 and CEX2 for a range of 3.0 to 4.2 V at RT and 45° C., FIG. 7.2. Full cell testing results of EX2 and CEX2 for a range of 3.0 to 4.35 V at RT and 45° C.

DETAILED DESCRIPTION

This invention provides an NMC or an NC(A) powder (further referred to as N(M)C) with a special monolithic morphology that can be used as positive electrode materials for both SSBs and conventional lithium ion batteries operating at high voltage. "Monolithic" refers here to a morphology where a secondary particle contains ideally only one primary particle. Other expressions of the word "monolithic material" are single crystal material, mono-crystal material, and one-body material. The preferred shape of the primary particle could be described as pebble stone shape wherein the aspect ratio of the primary particles is generally near 1.

One way to overcome or improve crack formation in battery applications is to avoid polycrystalline materials. Therefore, replacing them by N(M)C materials which have a morphology of single particles seems interesting since higher energy densities can be achieved, and since when batteries are cycled at a high voltage (to achieve higher capacities, such as for electric vehicle (EV) applications), fading mechanisms related to more pronounced volume changes and induced particle cracking are eliminated. The cross-sectional images of positive electrodes before and after cycling show that a monolithic N(M)C does not crack after cycling under high voltage, indicating it possesses an excellent mechanical strength. It is thus observed that the monolithic N(M)C has a much better cycle stability at a high voltage and high temperature than a polycrystalline N(M)C.

In SSBs, the monolithic morphology guarantees a good contact between the solid state electrolyte and the positive electrode material during cell packing and cycling, since it has a quasi spherical shape with flat areas providing a face to face contact—rather than a point to point contact. Therefore, distortion through grain boundaries as well as the formation of micro-cracks will be avoided during cycling. Furthermore, with regard to the unwanted side reactions occurring at the interface between electrolyte and solid positive electrode, as monolithic particles have a small surface, these undesired reactions can be limited. As a result, cycle stability will be enhanced and irreversible capacity loss will be prevented.

The monolithic particles preferably have a particle size distribution with a D50 of less than 10 μm, preferably less than 8 μm, and more preferably between 2 and 5 μm. When the average particle size is more than 10 μm, the battery performance may be worsening, leading to a lower capacity and higher irreversibility. If on the contrary the particle size is too small (i.e. <2 μm), the N(M)C powder is difficult to prepare using state of the art processes. For example, the powder cannot be sieved easily because of particle agglomeration. Also it is difficult to establish the contact with a solid electrolyte in SSBs, resulting in a poorer performance.

A typical precursor of a monolithic N(M)C is a mixed transition metal (N(M)C) hydroxide, oxy-hydroxide, carbonate, oxide, etc. The hydroxide and oxy-hydroxides have the general formula $Ni_xMn_yCo_zA_aO_v(OH)_w$, wherein $0 \leq v \leq 1$ and $v+w=2$, or $Ni_xMn_yCo_zA_a(OH_b)_2$, with $0.5 \leq b \leq 1$ and A being a dopant. These precursors might already have a monolithic shape. However, typically they are polycrystalline materials. Generally, the synthesis conditions of an powder influence the morphology of the final NMC powder. Producing monolithic materials from precursors having a polycrystalline structure, requires an optimization of synthesis parameters such as sintering temperature, sintering time, and molar ratio of Li to M (Li/M hereafter), where M is the sum of Ni, Co, Mn, and Al in $Li_{1+a}M_{1-a}O_2$. Obtaining a monolithic morphology is promoted by a high sintering temperature and a large Li excess (high Li/M). However, if Li/M is too high, the electrochemical performance deteriorates and secondary phases such as lithium carbonate and lithium hydroxide may be formed, which is not desired, as it may result in a swelling of batteries. A Li/M ratio close to 1.0 or slightly over 1.0 is preferred to obtain a desired electrochemical performance in layered positive electrode materials, although the optimized Li/M is also depending on the composition of M. For example, the optimized Li/M of $Li_{1+a}(Ni_{0.6}Mn_{0.2}Co_{0.2})_{1-a}O_2$ is around 1.00, while that of $Li_{1+a}(Ni_{0.47}Mn_{0.38}Co_{0.15})_{1-a}O_2$ is around 1.07. In case of $Li_{1+a}(Ni_{0.9}Co_{0.1})_{1-a}O_2$, it has the Li/M ratio of around 0.98. The electrochemical properties of N(M)Cs deteriorate when Li/M is higher or lower than this optimized Li/M.

The N(M)C powders may be manufactured using a conventional direct sintering process, which is a solid state reaction between a lithium source, usually $Li_2CO_3$ or $LiOH.H_2O$, and the precursors described before. First, the lithium source and the mixed transition metal source are homogeneously blended and then sintered. At this step, the ratio of Li/M in $LiMO_2$ is the final target composition. To further improve the quality of N(M)C coupled to a high throughput, a double sintering process may be performed. First, the mixed transition metal source is blended with a lithium source and then sintered. At this step, the mixture has the ratio of Li/M in $LiMO_2$ between 0.60 and <1.00. Then, in the $2^{nd}$ sintering, the lithium deficient sintered precursor is mixed with a lithium source in order to correct the ratio of Li/M to the final target composition.

When polycrystalline material is prepared, after the (final) sintering, the sintered cake is crushed, classified and sieved so as to obtain a non-agglomerated N(M)C powder. For obtaining a purely monolithic material however, a dedicated milling process of the positive electrode materials is more adapted, since it separates eventual secondary or agglomerated particles in solitary primary particles. A ball milling process with water is a preferred milling process for a monolithic N(M)C powder, and is a scalable process as well. The degree of milling can be mainly controlled by the amount of balls, the size of a ball, the size of the vessel, the rotating speed (RPM), and milling time.

Surface modification such as a coating on the surface of positive electrode materials is a known strategy to suppress side reactions between the electrode materials and the electrolytes that can lead to poor electrochemical performance during the cycling. Surface coatings may also enhance the structural stability of positive electrode materials, resulting in excellent battery performance. For example, coating materials such as metal oxides ($ZrO_2$, $SiO_2$, ZnO, $Al_2O_3$, $TiO_2$, $WO_3$ etc.) improve the battery properties even at high voltage or when cycling at elevated temperatures. Rough surface coatings may be formed by mechanically mixing positive electrode materials with a coating precursor, followed by a heat treatment of the mixture. However, this may lead to many bare areas on the surface of the electrode material particles, due to a localized formation of the coating layer. These uncoated areas remain weak sites to be attacked by electrolytes, which can lead to side reactions. Alternatively, a core-shell type approach can be adopted by the continuous deposition of coating materials on the surface of the positive electrode material particles. For example, a core-shell positive electrode material can be composed of a $Li(Ni_{0.8}Co_{0.1}Mn_{0.1})O_2$ core with a high capacity and a $Li(Ni_{0.5}Mn_{0.5})O_2$ shell with an excellent thermal stability, as is disclosed in J. Am. Chem. Soc., 2005, 127 (38), pp 13411-13418. Core-shell positive electrode material may thus show superior cycling stability and thermal stability.

Monolithic positive electrode materials can be further improved by applying certain Co based coatings, which we will refer to as "Co-(concentration) gradient" coatings. Providing a concentration gradient for the shell or the entire particle in fact constitutes a good approach to improve the electrochemical properties of positive electrode materials. Generally, positive electrode materials with a concentration gradient from the surface to the center can be obtained by using a metal precursor with a concentration gradient that is produced by a dedicated co-precipitation process. US 2013/0202966A1 describes a positive electrode active material having a concentration gradient layer using a batch reactor for co-precipitation. The positive electrode material has a prolonged lifespan and improved thermal stability. The heating process of the surface coated positive electrode powder is another typical method to obtain a concentration gradient by facilitating the decomposition of a coating source and forming the gradient.

The general coating process may proceed as follows:

Step 1) Coating of a Co precursor on the monolithic positive electrode material, where there is no limitation for the nature of the Co precursor. For example, Co precursors can be either one of $CoSO_4$, $Co(NO_3)_2$, $CoO_x$, $Co(OH)_2$, $CoCO_3$ and $LiCoO_2$. The process for coating the Co can be either a wet or a dry process. To control the Li/M stoichiometry of the final product—as discussed above—a Li source such like $Li_2CO_3$, $LiOH.H_2O$ or $LiNO_3$ may be added during the coating process.

Step 2) Heat treatment allowing Co to react with Li and to diffuse from the surface to the core, resulting in at least a surface layer enriched with Co. The inventors observe that the electrochemical property of monolithic positive electrode materials such as discharge capacity, rate capability and cycle stability can improve when there is a specific Co concentration gradient in the electrode particle, especially when the gradient is continuous. The selection of temperature for the heat treatment is a key parameter in the invention because it determines the degree of the gradient of Co in a particle, which may be analyzed by an EDS (or WDS) analysis on a cross-section of the particle, whereby an EDS scanning time per analysis point of at least 1 minute is employed. When Mn is present, the Co/Mn (mol/mol) ratio is considered as a criterion to define the degree of the gradient.

It may further be beneficial to apply other surface treatments on the N(M)C materials having a Co-gradient coating. For example, WO2016/116862 discloses a surface treatment providing a surface layer consisting of an intimate mixture of the metal elements of the N(M)C materials and either one or more compounds from the group consisting of $Al_2O_3$, $TiO_2$, MgO, $WO_3$, $ZrO_2$, $Cr_2O_3$ and $V_2O_5$. In a particular embodiment the surface layer consists of an intimate mixture of elements of the core, LiF and nanometric crystalline $Al_2O_3$, which treatment allows to increase the charging voltage without deteriorating performance, and thus allowing to achieve a higher energy density. As is discussed in WO2015/128722, the decomposition of soluble surface base compounds, which directly influences the battery performance, can be further enhanced by applying a surface treatment with $Na_2S_2O_8$. As an example, the $Na_2S_2O_8$ treatment could be combined with $AlF_3$ (or $Li_3AlF_6$), $AlPO_4$, $Al(OH)_2$ or $Al_2O_3$ treatment. Both the fluorides, the phosphates, the oxide and the hydroxide are lithium acceptors, which can help to decompose the soluble base and at the same time create an oxide $Al_2O_3$ or $LiAlO_2$ surface film.

This invention provides a positive electrode material, which has excellent electrochemical properties due to the synergetic effect between its monolithic morphology and the special gradient of Co in the electrode particle, eventually supplemented by other dedicated surface coatings or treatments.

The following analysis methods are used in the Examples:

A) SEM and EDS Analysis

A1) SEM Analysis

A morphology of a material, cross section of positive electrodes, and cross section of positive electrode materials are analyzed by a Scanning Electron Microscopy (SEM) technique. The measurement is performed with a JEOL JSM 7100F scanning electron microscope equipment under a high vacuum environment of $9.6 \times 10^{-5}$ Pa at 25° C. The images of samples are recorded with magnification of (at least) 5000 times to demonstrate the monolithic structure of the materials.

A2) Cross-Section Preparation

Cross-sections of either positive electrodes or positive electrode material are prepared by an ion beam cross-section polisher (CP) instrument, which is a JEOL (IB-0920CP). The instrument uses argon gas as beam source.

The positive electrodes are prepared by following the procedure described below in E1). The electrodes are cut before and after cycling as described in method E2). The electrodes are attached onto an aluminum foil. Later, the foil is attached to the sample holder and placed in the instrument. In a standard procedure, the voltage is set as 6.5 kV with a duration of 3.5 hours duration. A small amount of a positive electrode material powder is mixed with a resin and hardener, then the mixture is heated for 10 minutes on a hot plate. After heating, it is placed into the ion beam instrument for cutting and the settings are adjusted in a standard procedure, with a voltage of 6.5 kV for a 3 hours duration. The cross-section of positive electrode materials is analyzed by method A1).

A3) EDS Analysis

Figure 62:
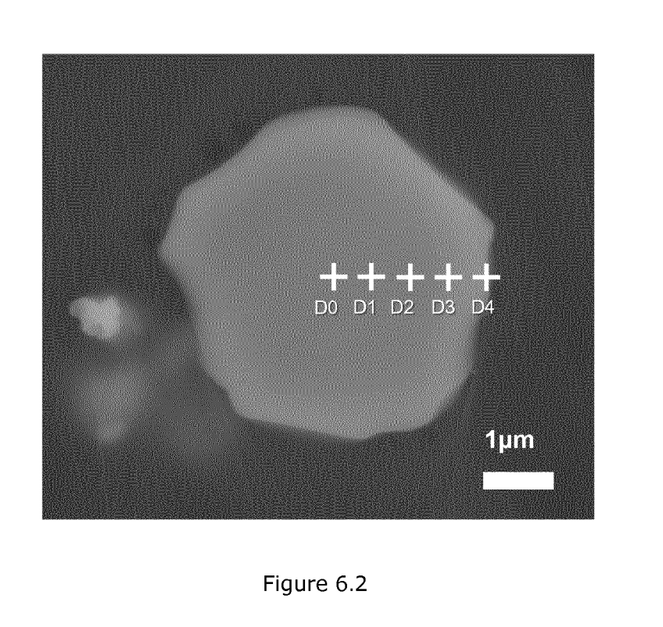

Using the samples prepared in method A2), the concentration gradient from the surface to the center of the positive electrode material particles is analyzed by SEM and energy-dispersive X-ray spectroscopy (EDS). The SEM/EDS is performed on a JEOL JSM 7100F SEM equipment with a 50 mm$^2$ X-Max$^N$ EDS sensor from Oxford instruments. An EDS analysis of the positive electrode material particles provides the quantitative element analysis of the cross-section. In the cross-section EDS, it is assumed that particles are spherical. A straight line is set from the center point to the surface of a particle, and the center point is set as 'D0' and the surface point is set as 'D4'. By setting the additional three points, which are 'D1', 'D2', and 'D3', between the center (D0) and the surface (D4), 5 points are investigated by EDS analysis with a scanning time of 1 min. (see FIG. 6.2).

B) PSD Analysis

The PSD is measured using a Malvern Mastersizer 3000 with Hydro MV wet dispersion accessory, after dispersing the powder in an aqueous medium. In order to improve the dispersion of the powder, sufficient ultrasonic irradiation and stirring is applied, and an appropriate surfactant is introduced. D10, D50, and D90 are defined as the particle size at 10%, 50%, and 90% of the cumulative volume % distribution.

C) X-Ray Diffraction Measurement

X-ray diffraction of the positive electrode material is measured using a Rigaku X-Ray Diffractometer (Ultima IV). The measurement is carried out using a Cu-Kα radiation source in a range of diffraction angle (2θ) from 5 to 90° to collect an X-ray diffraction patterns. The scan speed is set at continuous scanning at 1° per minute with the step-size of 0.02° per scans.

The value v and w in $Ni_xMn_yCo_zA_aO_v(OH)_w$, wherein $0 \leq v \leq 1$ and $v+w=2$, can be obtained by a Rietveld refinement technique from the obtained XRD pattern. TOPAS is used as a software for the Rietveld refinement. The Rietveld refinement provides the lattice parameters such as lattice a and lattice c of $Ni_xMn_yCo_zA_aO_v(OH)_w$ which space group is P-3 m1. As the value v in $Ni_xMn_yCo_zA_aO_v(OH)_w$ increases from 0 to 1, lattice a linearly decreases. For example, $Ni_xMn_y$-$Co_zA_a(OH)_2$ (when $v=0$ and $w=2$) has lattice a of 3.18 Å while $Ni_xMn_yCo_zA_aOOH$ (when $v=1$ and $w=1$) has $a=2.85$ Å. Therefore, in this case, the following formula can be used to obtain the value v:

$$v = 3.03 \times \text{lattice } a + 9.64$$

D) ICP Analysis

The Li, Ni, Mn and Co contents of the electrode active material are measured with the Inductively Coupled Plasma (ICP) method by using an Agillent ICP 720-ES. 2 g of product powder sample is dissolved into 10 ml high purity hydrochloric acid in an Erlenmeyer flask. The flask can be covered with glass and heated on a hot plate for complete dissolution of the precursor. After being cooled to the room temperature, the solution is moved to a 100 mL volumetric flask with 3-4 times of rinsing the flask using distilled (DI) water. Afterwards, the volumetric flask is filled with DI water up to the 100 mL mark, followed by complete homogenization. 5 ml solution is taken out by a 5 ml pipette and transferred into a 50 ml volumetric flask for a $2^{nd}$ dilution, where the volumetric flask is filled with 10% hydrochloric acid up to the 50 ml mark and then homogenized. Finally, this 50 ml solution is used for ICP measurement.

E) Coin Cell Testing

E1) Coin Cell Preparation

For the preparation of a positive electrode, a slurry that contains electrochemical active material, conductor (Super P, Timcal), binder (KF #9305, Kureha)—with a formulation of 90:5:5 by weight—in a solvent (NMP, Mitsubishi) is prepared by a high speed homogenizer. The homogenized slurry is spread on one side of an aluminum foil using a doctor blade coater with a 230 μm gap. The slurry coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between a positive electrode and a piece of lithium foil used as a negative electrode. 1M $LiPF_6$ in EC/DMC (1:2) is used as electrolyte and is dropped between separator and electrodes. Then, the coin cell is completely sealed to prevent leakage of the electrolyte.

E2) Testing Method 1

Each cell is cycled to high voltage (4.7V) at 50° C. in Neware computer-controlled galvanostatic cycling stations. The coin cell testing schedule uses a 1C current definition of 160 mA/g. Table 1 shows the coin cell test schedule.

TABLE 1

Cycling schedule for coin cell testing method 1

| | Charge | | | | Discharge | | | |
|---|---|---|---|---|---|---|---|---|
| Cycle No | C Rate | End current | Rest (min) | V/Li metal (V) | C Rate | End current | Rest (min) | V/Li metal (V) |
| 1 | 0.10 | — | 30 | 4.7 | 0.10 | — | 30 | 3.0 |
| 2-51 | 0.50 | 0.1 C | 10 | 4.7 | 1.00 | — | 10 | 3.0 |
| 52 | 0.10 | — | 30 | 4.7 | 0.10 | — | 30 | 3.0 |

E3) Testing Method 2

Method 2 is a conventional "constant cut-off voltage" test. The conventional coin cell test in the present invention follows the schedule shown in Table 2. Each cell is cycled at 25° C. using a Toscat-3100 computer-controlled galvanostatic cycling station (from Toyo). The coin cell testing procedure uses a 1C current definition of 160 mA/g and comprises two parts as follows:

Part I is the evaluation of rate performance at 0.1C, 0.2C, 0.5C, 1C, 2C, and 3C in the 4.3-3.0V/Li metal window range. With the exception of the $1^{st}$ cycle where the initial charge capacity (CQ1) and discharge capacity (DQ1) are measured in constant current mode (CC), all subsequent cycles feature a constant current-constant voltage during the charge with an end current criterion of 0.05C. A rest time of 30 minutes for the first cycle and 10 minutes for all subsequent cycles is allowed between each charge and discharge.

The irreversible capacity $Q_{Irr.}$ is expressed in % as follows:

$$Q_{Irr.} = \frac{(CQ1 - DQ1)}{CQ1} \times 100(\%)$$

The rate performance at 0.2C, 0.5C, 1C, 2C, and 3C is expressed as the ratio between the retained discharge capacity DQn, with n=2, 3, 4, 5, and 6 for respectively nC=0.2C, 0.5C, 1C, 2C, and 3C as follows:

$$nC-\text{rate} = \frac{DQn}{DQ1} \times 100(\%)$$

For example, $$3C-\text{rate (in \%)} = \frac{DQ6}{DQ1} \times 100$$

Part II is the evaluation of cycle life at 1C. The charge cut-off voltage is set at 4.5V/Li metal. The discharge capacity at 4.5V/Li metal is measured at 0.1C at cycles 7 and 34 and 1C at cycles 8 and 35. Capacity fading at 1C is calculated as follows and is expressed in % per 100 cycles:

$$1C\ QFad. = \left(1 - \frac{DQ35}{DQ8}\right) \times \frac{10000}{27}\ in\ \%/100\ cycles$$

TABLE 2

Cycling schedule for Coin cell testing method 2

| | | Charge | | | | Discharge | | | |
|---|---|---|---|---|---|---|---|---|---|
| Type | Cycle No | C Rate | End current | Rest (min) | V/Li metal (V) | C Rate | End current | Rest (min) | V/Li metal (V) |
| Part I | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II | 7 | 0.25 | 0.1 C | 10 | 4.5 | 0.10 | — | 10 | 3.0 |
| | 8 | 0.25 | 0.1 C | 10 | 4.5 | 1.00 | — | 10 | 3.0 |
| | 9~33 | 0.50 | 0.1 C | 10 | 4.5 | 1.00 | — | 10 | 3.0 |
| | 34 | 0.25 | 0.1 C | 10 | 4.5 | 0.10 | — | 10 | 3.0 |
| | 35 | 0.25 | 0.1 C | 10 | 4.5 | 1.00 | — | 10 | 3.0 |

F) Full Cell Testing 200 mAh pouch-type cells are prepared as follows: the positive electrode material, Super-P (Super-P, Timcal), graphite (KS-6, Timcal) as positive electrode conductive agents and polyvinylidene fluoride (PVDF 1710, Kureha) as positive electrode binder are added to N-methyl-2-pyrrolidone (NMP) as dispersion medium so that the mass ratio of the positive electrode active material powder, the positive electrode conductive agents (super P and graphite) and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 μm thick aluminum foil. The width of the applied area is 26 mm and the length is 190 mm. Typical loading weight of a positive electrode active material is about 11±1 mg/cm². The electrode is then dried and calendared using a pressure of 100 Kgf to an electrode density of 3.3±0.5 g/cm³. In addition, an aluminum plate serving as a positive electrode current collector tab is arc-welded to an end portion of the positive electrode. Commercially available negative electrodes are used. In short, a mixture of graphite, carboxy-methyl-cellulose-sodium (CMC), and styrenebutadiene-rubber (SBR), in a mass ratio of 96/2/2, is applied on both sides of a copper foil. A nickel plate serving as a negative electrode current collector tab is arc-welded to an end portion of the negative electrode. A typical loading weight of a negative electrode active material is 10±1 mg/cm². Non-aqueous electrolyte is obtained by dissolving lithium hexafluorophosphate (LiPF$_6$) salt at a concentration of 1.0 mol/L in a mixed solvent of ethylene carbonate (EC) and diethyl carbonate (DEC) in a volume ratio of 1:2.

A sheet of the positive electrode, a sheet of the negative electrode, and a sheet of the separator made of a 20 μm-thick microporous polymer film (Celgard® 2320, Celgard) interposed between them are spirally wound using a winding core rod in order to obtain a spirally-wound electrode assembly. The assembly and the electrolyte are then put in an aluminum laminated pouch in an air-dry room with dew point of −50° C., so that a flat pouch-type lithium secondary battery is prepared. The design capacity of the secondary battery is 200 mAh when charged to 4.20V.

The non-aqueous electrolyte solution is impregnated for 8 hours at room temperature. The battery is pre-charged to 15% of its theoretical capacity and aged for a day at room temperature. The battery is then degassed and the aluminum pouch is sealed. The battery is prepared for use as follows: the battery is charged using a current of 0.2C (with 1C=200 mA) in CC mode (constant current) up to 4.2V or 4.35V, then in CV mode (constant voltage) until a cut-off current of C/20 is reached, before the discharge in CC mode at 0.5C rate, down to a cut-off voltage of 3.0V.

The prepared full cell battery is charged and discharged several times under the following conditions at 25° C. or at elevated temperature (for example 45° C.), to determine their charge-discharge cycle performance:
  charge is performed in CC mode under 1C rate up to 4.2V or 4.5V, then CV mode until C/20 is reached,
  the cell is then set to rest for 10 minutes,
  discharge is done in CC mode at 1C rate down to 3.0V,
  the cell is then set to rest for 10 minutes,
  the charge-discharge cycles proceed until the battery reaches around 80% retained capacity. Every 100 cycles, one discharge is done at 0.2C rate in CC mode down to 3.0V.

The invention is further exemplified in the following examples:

Explanatory Example 1

This example illustrates that N(M)C products suffer from a large volume change during charge/discharge cycles at high voltage and elevated temperature, and its consequences. A monolithic N(M)C powder labeled EEX1.1, having the formula $Li_{1+a}(Ni_{0.47}Mn_{0.38}Co_{0.15})_{1-a}O_2$ doped with around 0.28% Ba (in weight), where (1+a)/(1−a) represents the ratio Li/M, is prepared by the following procedure:

1) Preparation of a precursor of NMC: a mixed transition metal hydroxide $MO_{0.21}(OH)_{1.29}$ (wherein M=$Ni_{0.42}Mn_{0.38}Co_{0.15}$) is produced by a conventional co-precipitation process using a continuous stirred tank reactor (CSTR) with mixed nickel-manganese-cobalt sulfates (MSO$_4$), sodium hydroxide (NaOH), and ammonium hydroxide (NH$_4$OH).

2) Blending: The mixed transition metal hydroxide is blended with $Li_2CO_3$ (from Rockwood) as a lithium source and barium carbonate ($BaCO_3$) (Reagent Duksan, 99.9%), with a target Li/M ratio of 1.07 and a Ba/M ratio of 0.2 mol %, through a dry blending method in a tubular mixer for a couple of hours.

3) Sintering: The mixture from step 2) is sintered at 1020° C. under dry air atmosphere for 10 hours in a chamber furnace.

4) Post treatment: The sintered product is grinded to avoid the formation of agglomerates.

A polycrystalline NMC powder $Li_{1+a}(Ni_{0.42}Mn_{0.38}Co_{0.15})_{1-a}O_2$, where Li/M is 1.07, is prepared following the same procedure of EEX1.1, without $BaCO_3$ additive, and with a sintering temperature of 925° C. The obtained product is labeled as EEX1.2. The monolithic NMC powder (EEX1.1) has a D50 of 6.96 µm as determined by method B).

A positive electrode is prepared with a) monolithic NMC (EEX1.1) and b) polycrystalline NMC (EEX1.2) as described in method E1). The fresh electrodes are labeled EEX1.1-FE and EEX1.2-FE, respectively. The cycled electrodes are prepared following the procedure in method E2) and are labelled EEX1.1-CE and EEX1.2-CE, respectively. A cross-section of these four electrodes or electrode materials is analyzed as described in methods A2) and A1).

Figure 1:
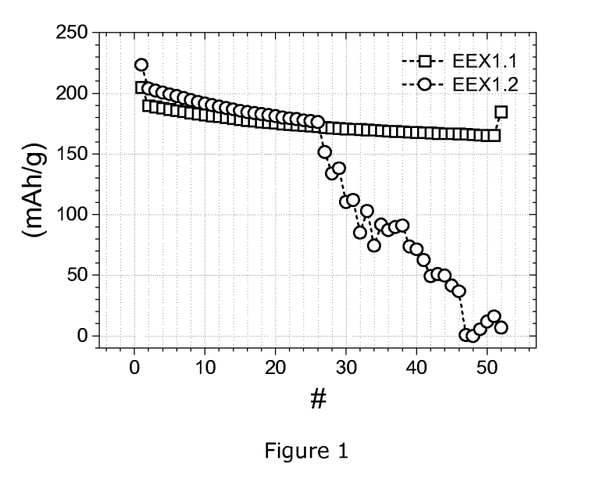

FIG. 1 shows the discharge capacities (y axis mAh/g) of EEX1.1 and EEX1.2 as a function of cycle number (x axis-#) where the y axis is the discharge capacity. The testing method E2) is very tough because of the high upper cut off voltage (4.7V), the elevated temperature (50° C.) and the fast charge/discharge rate (0.5C charge/1.0C discharge). It is confirmed that the monolithic NMC (EEX1.1) has a good cycling stability even in these severe conditions while the polycrystalline NMC (EEX1.2) has an issue as from the 26$^{th}$ cycle, resulting in significant capacity fading.

Figure 2:
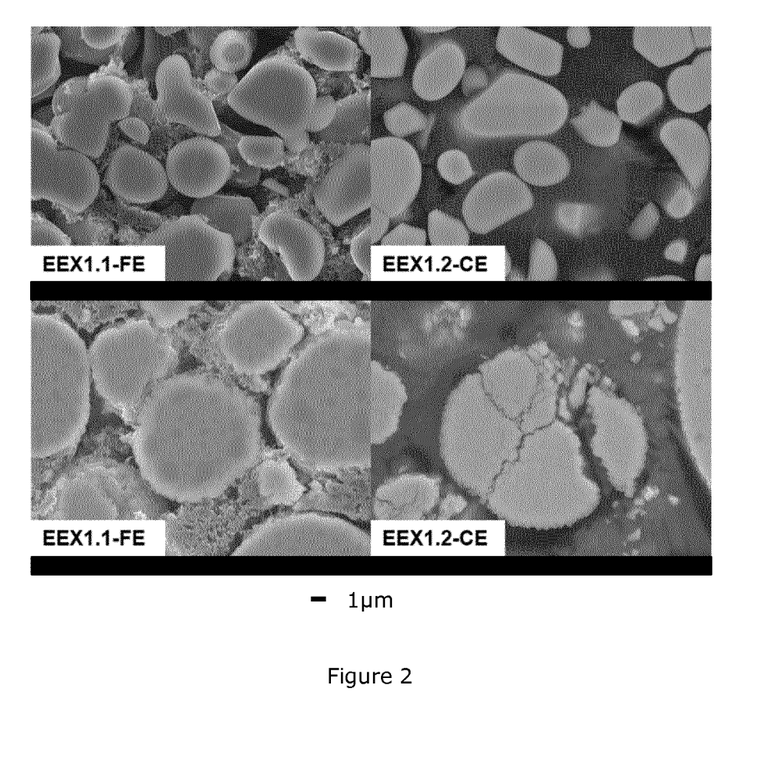

FIG. 2 presents the cross-sectional images of EEX1.1-FE, EEX1.1-CE, EEX1.2-FE and EEX1.2-CE. It is clearly observed that the polycrystalline NMC in the electrode (EEX1.2-CE) has lots of macro- and micro-cracks after cycling at 4.7V, while the cycled monolithic NMC has no micro-cracks. Therefore, it is proven that the monolithic NMC can endure the volume change much better than the polycrystalline NMC, resulting in the improved cycling stability.

Explanatory Example 2

This example shows the electrochemical property of monolithic NMC bearing different coating elements. The monolithic NMC powder EEX1.1 is stirred with 13 ml of 5 mol % $Co(NO_3)_2.6H_2O$ solution (compared to the amount of M) and 2 ml of water for a couple of hours at 180° C. in a 250 ml beaker. After that, the prepared blend is heated for 5 hours at 850° C. under dry air atmosphere in a chamber furnace. The product is Co-gradient coated monolithic NMC, having the formula $Li_{1+a}(Ni_{0.448}Mn_{0.362}Co_{0.190})_{1-a}O_2$, where Li/M is 1.02, and is labeled EEX2.1. EEX2.2 is prepared according to the same method as in EEX2.1, except that the coating source is $Mn_{0.5}Co_{0.5}(NO_3)_2$. EEX2.3 is also prepared according to the same method as in EEX2.1, with $Mn(NO_3)_2.6H_2O$ as coating source.

To evaluate the obtained products in a positive electrode for lithium ion batteries, coin cells are prepared by method E1), and tested with method E3). The initial discharge capacity, irreversibility, rate capability and capacity fading of EEX1.1, EEX2.1, EEX2.2 and EEX2.3 are shown in Table 3.

TABLE 3

Electrochemical properties of Explanatory Example 2

| Example ID | DQ1 (mAh/g) | $Q_{Irr.}$ (%) | 3C (%) | 1C Qfad. (%) |
| --- | --- | --- | --- | --- |
| EEX1.1 | 156.3 | 15.1 | 77.4 | 57.6 |
| EEX2.1 | 160.6 | 10.9 | 82.6 | 39.2 |
| EEX2.2 | 153.2 | 15.0 | 77.1 | 50.6 |
| EEX2.3 | 135.3 | 22.7 | 62.5 | 64.0 |

Co-gradient coated positive electrode material (EEX2.1) has a higher initial discharge capacity, lower irreversibility, better rate performance, and enhanced cycling stability than EEX1.1, EEX2.2, and EEX2.3.

Example 1 and Comparative Example 1

A monolithic NMC powder, having the target formula $Li_{1+a}(Ni_{0.625}Mn_{0.175}Co_{0.200})_{1-a}O_2$, where Li/M is 1.01, is obtained through a double sintering process such as there is an example in WO2018/158078 (however not monolithic)—which is a solid state reaction between a lithium source, usually $Li_2CO_3$ or $LiOH.H_2O$, and a mixed transition metal source, which is $Ni_{0.625}Mn_{0.175}Co_{0.20}O_{0.43}(OH)_{1.52}$ (from E&D Co.). The mixed transition metal source has an average particle size in the range of 2 to 4 µm, which leads to a monolithic morphology during the preparation of the NMC powder.

Here, the process includes the two separate sintering steps as follows:

1) 1$^{st}$ blending: to obtain a lithium deficient sintered precursor, $LiOH.H_2O$ and a mixed transition metal source are homogenously blended at Li/M ratio of 0.90 in a Henschel Mixer® for 30 minutes.

2) 1$^{st}$ sintering: the blend from the 1$^{st}$ blending step is sintered at 750° C. for 10 hours under an oxygen containing atmosphere in a chamber furnace. After the 1$^{st}$ sintering, the sintered cake is crushed, classified and sieved so as to prepare it for the 2$^{nd}$ blending step. The product obtained from this step is a lithium deficient sintered precursor, meaning that the Li/M stoichiometric ratio in $LiMO_2$ is less than 1.

3) 2$^{nd}$ blending: the lithium deficient sintered precursor is blended with $LiOH.H_2O$ in order to correct the Li stoichiometry (Li/M=1.01). The blending is performed in a Henschel Mixer® for 30 minutes.

4) 2$^{nd}$ sintering: the blend from the 2$^{nd}$ blending is sintered at 930° C. for 12 hours under an oxygen containing atmosphere in a chamber furnace.

5) Wet ball milling: this treatment is applied to break the agglomerated NMC powder from the 2$^{nd}$ sintering into separate particles using water and 10 mm $ZrO_2$ balls under 50 RPM for 15 hours in a ball mill equipment. After the milling process, the wet NMC powder is dried at 80° C. for 2 days under ambient air in an oven.

The monolithic NMC powder produced by above steps is labeled CEX1.1. CEX1.1 is blended with 5 mol % of powderous $Co(NO_3)_2.6H_2O$ as a coating source and 5 mol % $LiOH.H_2O$ as a lithium source (compared to M in CEX1.1) in a tubular mixer for a couple of hours. After that, the prepared blend is heated for 10 hours in the range of 750-800° C. under an oxygen containing atmosphere in a chamber furnace. The product is labeled EX1.1. The monolithic NMC powder with a Co-gradient coating, labeled EX1.2, is prepared following the same procedure as EX1.1, except that the amount of nitrate powder as a Co coating source is 2 mol % $Co(NO_3)_2.6H_2O$ and the amount of $LiOH.H_2O$ as a Li source is 2 mol %. A sample labeled EX1.3, is prepared following the same procedure of EX1.1, except that the amount of nitrate powder is 10 mol % $Co(NO_3)_2.6H_2O$ and the amount of $LiOH.H_2O$ is 10 mol %.

The particle size of EX1.1 is determined by method B), the D50 value is shown in Table 5. The electrochemical performance of EX1.1 to EX1.3 is evaluated by method E3). The initial discharge capacity, irreversibility, rate capability and capacity fading of EX1.1 to EX1.3 are shown in Table 5.

Figure 3:
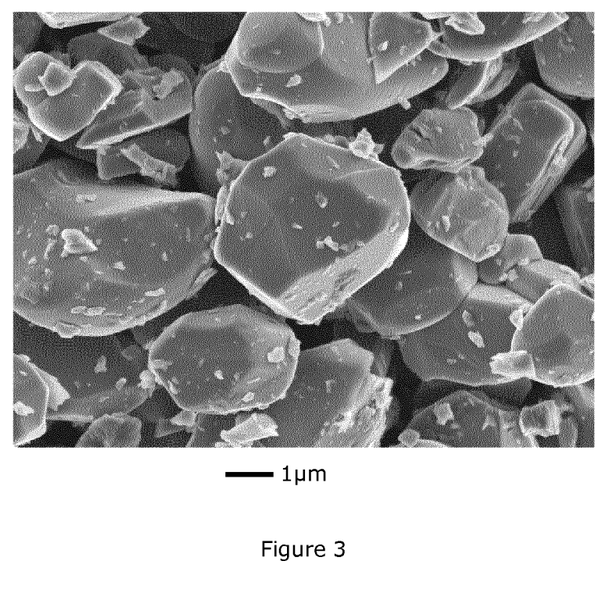

To observe its structure as positive electrode material, CEX1.1 is analyzed by method A1). As shown in FIG. 3, CEX1.1 has particles comprising irregular shapes and flat surfaces. In addition, each particle is a single primary particle (without agglomerated morphology).

Therefore, in this invention, "monolithic NMC" refers to a positive electrode material comprising single particles.

Figure 4:
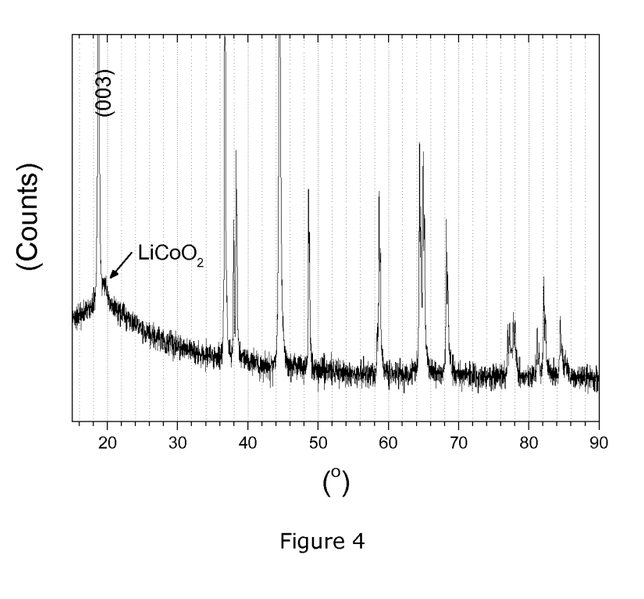
Figure 5:
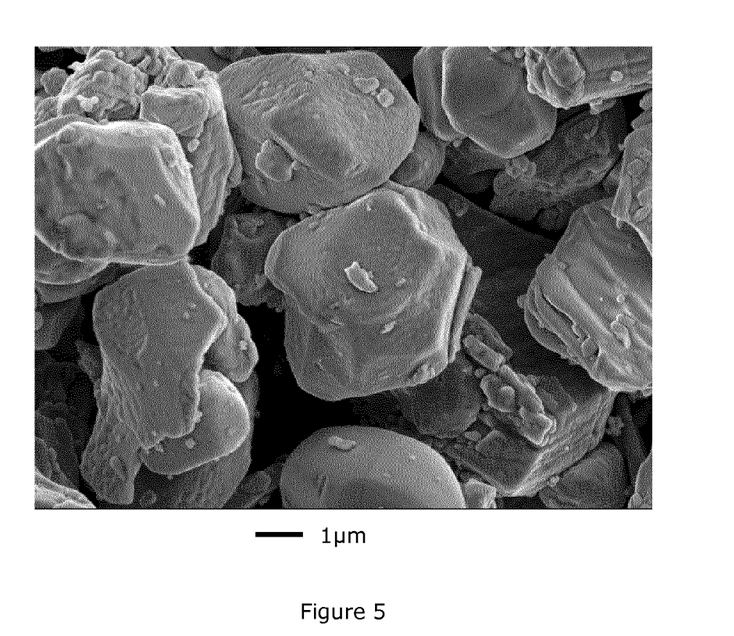

After the Co-gradient coating on the monolithic NMC powder, EX1.1 is investigated by method C). As shown in FIG. 4 (x-axis: 2θ, y-axis: log intensity), EX1.1 has a slight (003) peak of $LiCoO_2$ at around 19.5°, which is distinguished from the (003) peak of NMC at around 18.7°. As Co and lithium sources are used for obtaining the Co gradient concentration, the monolithic powder is coated by $LiCoO_2$ while maintaining the surface morphology in the electrode particle. FIG. 5 indicates that EX1.1 has a monolithic morphology with flat surfaces, even after a Co-gradient coating. The monolithic NMC particles have an aspect ratio of 0.8 or higher, which is ratio of the minimum diameter to the maximum diameter of the particle. Such NMC particles may be considered (quasi) spherical or oval.

As shown in the Table 4 for EX1.1, method D) indicates that the composition of the CEX1.1 is changed after a Co-gradient coating. The Co molar concentration increases whilst the Ni and Mn molar concentrations decrease, but maintaining the Li/M ratio of the total NMC composition. EX1.2 and 1.3 have the formulas $Li_{1+a}(Ni_{0.613}Mn_{0.172}Co_{0.216})_{1-a}O_2$ and $Li_{1+a}(Ni_{0.568}Mn_{0.159}Co_{0.273})_{1-a}O_2$, where Li/M is 1.01.

TABLE 4

ICP results of Example 1.1 and Comparative Example 1.1

| Sample ID | Li/M ratio | Ni (mol %) | Mn (mol %) | Co (mol %) |
|---|---|---|---|---|
| EX1.1 | 1.01 | 60.2 | 16.4 | 23.4 |
| CEX1.1 | 1.01 | 63.0 | 17.3 | 19.7 |

CEX1.2 is prepared according to the same method as EX1.1, except that the heating temperature for forming the Co gradient is 500° C. For CEX1.3 the heating temperature for forming the Co gradient is 900° C. CEX1.4 is manufactured according to the same method as CEX1.1, except that the $2^{nd}$ sintering temperature is 950° C. CEX1.4 is also blended with Co and Li sources and then sintered according to the same method as EX1.1. The product is labeled EX1.4. CEX1.2, CEX1.3 and EX1.4 have the formula $Li_{1+a}(Ni_{0.595}Mn_{0.167}Co_{0.238})_{1-a}O_2$, where Li/M is 1.01. The average particle size of EX1.4 and CEX1.4, analyzed with method B) are shown in Table 5. The electrochemical performance of EX1.4 and CEX1.1 to CEX1.4 are evaluated according to method E3). Their initial discharge capacity, irreversibility, rate capability and capacity fading are shown in Table 5.

TABLE 5

Electrochemical properties of Example 1 and Comparative Example 1

| Example ID | Coating amount of Co (mol %) | Heating Temp. (° C.) (*) | D50 (μm) | CM(4)/CM(3) | DQ1 (mAh/g) | $Q_{Irr.}$ (%) | 3 C (%) | 1 C Qfad. (%) |
|---|---|---|---|---|---|---|---|---|
| EX1.1 | 5 | 750 | 4.83 | 1.19 | 178.6 | 9.5 | 87.5 | 15.4 |
| EX1.2 | 2 | 800 | | | 180.8 | 9.2 | 87.0 | 17.8 |
| EX1.3 | 10 | 800 | | | 179.3 | 7.1 | 88.5 | 15.5 |
| EX1.4 | 5 | 750 | 6.39 | | 174.5 | 12.5 | 86.7 | 9.3 |
| CEX1.1 | — | — | 3.45 | | 175.5 | 12.6 | 85.8 | 15.2 |
| CEX1.2 | 5 | 500 | | 1.42 | 168.3 | 13.4 | 63.1 | 232.0 |
| CEX1.3 | 5 | 900 | | 1.01 | 167.6 | 14.0 | 83.9 | 20.8 |
| CEX1.4 | — | — | 6.02 | | 168.9 | 15.6 | 83.9 | 14.7 |

(*) Heating temperature of dry coated samples to obtain the Co gradient

EX1.1, EX1.2 and EX1.3 have higher discharge capacity, lower irreversibility and better rate capability than CEX1.1, CEX1.2 and CEX1.3. It is assumed that these excellent electrochemical performance of EX1.1, EX1.2 and EX1.3 originate from the Co concentration gradient.

Figure 61:
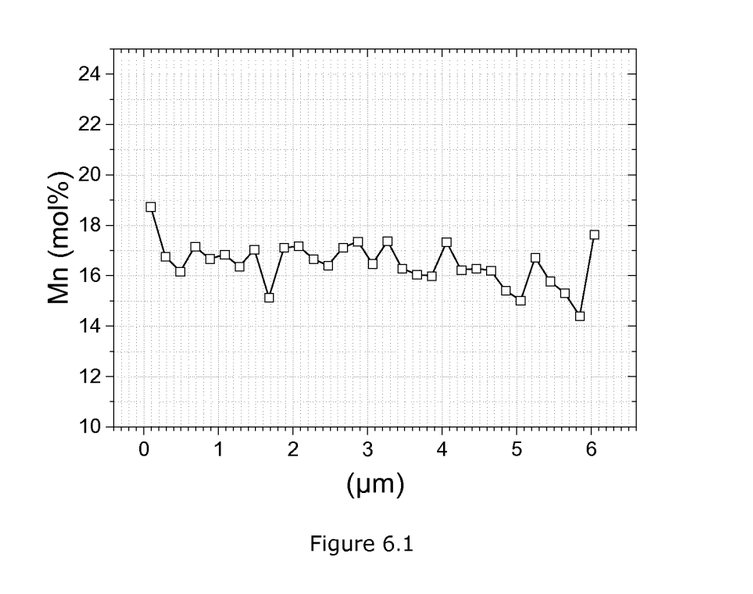
Figure 63:
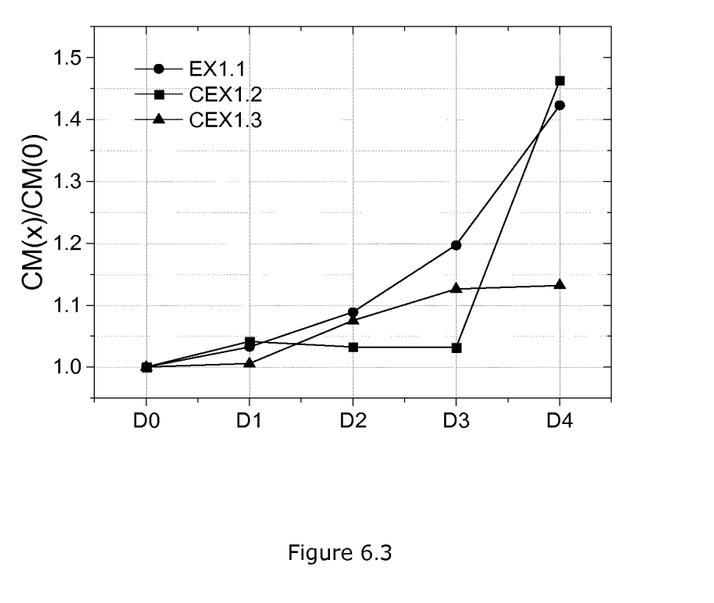

To investigate the formation of a Co concentration gradient on the NMC products depending on their heating temperature, EX1.1, CEX1.2 and CEX1.3 are analyzed by method A3). As shown in FIG. 6.1 (x axis: distance, y axis: molar percentage), since the EDS line-scan analysis (scanning time per detection point: 10 s) of EX1.1 indicates that the Mn molar concentration is constant, the Mn content is set as a calibration value to determine the degree of the Co concentration gradient in the electrode particle. To obtain the accurate elemental analysis in the NMC products, FIG. 6.2 shows a cross-sectional SEM image of EX1.1, with selected positions (D0, D1, D2, D3, and D4) for dedicated EDS analysis. The EDS scanning time per analysis point is increased to 1 minute, resulting in more reliable data. FIG. 6.3 shows the EDS analysis results of the selected positions (x axis—Dx position), where the y axis indicates the normalized Co/Mn molar ratio (CM(x)) obtained by dividing the Co/Mn ratio of each position (D1-D4) by the Co/Mn ratio on position D0. This normalized Co/Mn value can be used to determine the degree of Co gradient. Accordingly, the Co/Mn molar ratios on D0 to D4 are indicated as CM(0) to CM(4) respectively. As shown in FIG. 6.3, the Co/Mn (mol/mol) ratio of a surface part is higher than that of a center part in the electrode particles. EX1.1 prepared at 750° C., has a steadily decreasing Co concentration gradient from D4 to D0, while CEX1.2, prepared at 500° C., has a sharply changing composition. It indicates that 500° C. as heating temperature is not high enough to make Co diffuse into the bulk, which results in poor electrochemical properties. CEX1.3, prepared at 900° C., has a relatively constant value for CM(x)/CM(0) from D2 to D4. It indicates that 900° C. is too high to create the desired Co gradient, also resulting in poor electrochemical properties.

As NMC sample EX1.1 with a continuous Co concentration gradient has the best electrochemical performance, for describing the invention CM(4)/CM(3) can represent a desired degree of a concentration gradient. As shown in Table 5, EX1.1, CEX2.2, and CEX2.3 have such gradient values of 1.19, 1.42, and 1.01, respectively. Furthermore, EX1.1, EX1.4, and CEX1.4 have the average particle size of 4.83, 6.39, and 6.02 µm, respectively. CEX1.4 having a larger particle size than EX1.1 has a lower discharge capacity and higher irreversibility, but when a Co-gradient coating is applied, EX1.4 shows the enhanced electrochemical performance versus CEX1.4. When the particle size of the Co-gradient monolithic particles increases, the advantages become less pronounced, as is shown by EX1.4, having comparable DQ1 and $Q_{Irr.}$ as CEX1.1, but still having a better 3C and Qfad. value. Therefore, according to the present invention, the NMC products having an average particle size of less than 10 µm, preferably less than 8 µm, and even more preferably between 2 and 5 µm deliver preferred electrochemical properties.

Example 2 and Comparative Example 2

Figure 71:
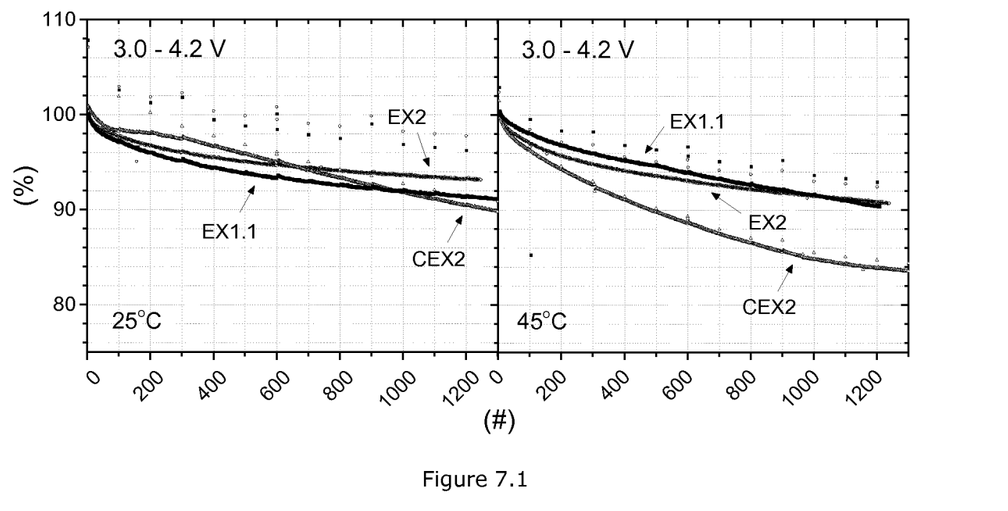
Figure 72:
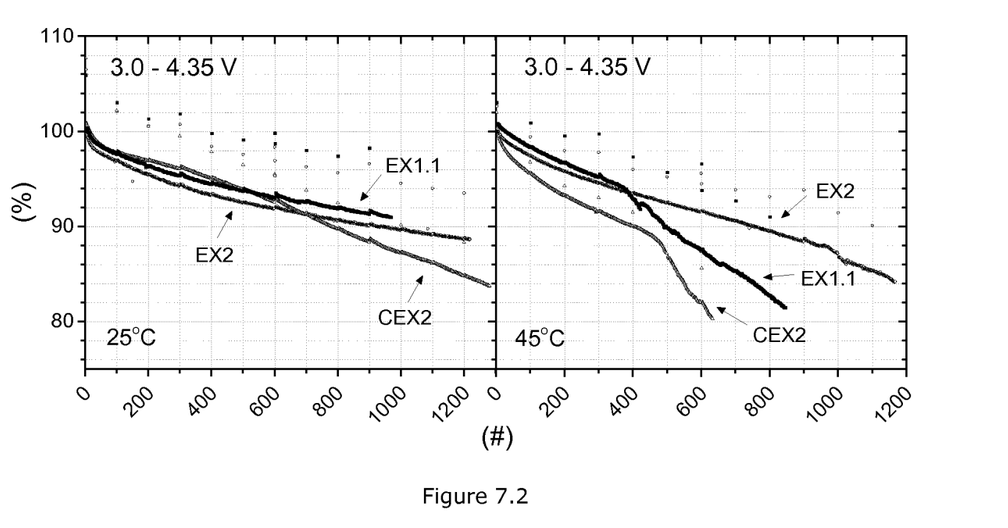

EX1.1 is blended with 1.2 wt % of sodium persulfate ($Na_2S_2O_8$) and 0.2 wt % aluminum oxide ($Al_2O_3$) in a Henschel Mixer® for 30 minutes. The blend is heated at 375° C. for 5 hours under air. As is described in WO2015/128722 (Example 3), the final product carries a coating comprising $LiNaSO_4$ and $Al_2O_3$, and is named EX2. A polycrystalline NMC powder is manufactured by the same method as CEX1.1, except that $Ni_{0.625}Mn_{0.175}Co_{0.20}O_{0.39}(OH)_{1.61}$ with an average particle size of 10 to 12 µm is used, and the $1^{st}$ blend has a Li/M ratio of 0.8. The $1^{st}$ and $2^{nd}$ sintering temperature are 885° C. and 840° C. respectively. By the selection of precursor particle size and sintering temperatures, a polycrystalline material is obtained. After the $2^{nd}$ sintering, the sintered cake is crushed, classified and sieved so as to obtain a non-agglomerated NMC powder. This powder has a Li/M ratio of 1.045. The obtained powder is blended with 1.2 wt % of sodium persulfate ($Na_2S_2O_8$) and 0.2 wt % aluminum oxide ($Al_2O_3$) in a Henschel Mixer® for 30 minutes. The blend is heated at 375° C. for 5 hours under an air atmosphere. The final product is named CEX2. The electrochemical performance of EX1.1, EX2 and CEX2 is evaluated by method F). FIGS. 7.1 and 7.2 show the full cell cycle stability at 4.2V and 4.35V, respectively (x-axis: number of cycles #; y-axis: relative discharge capacity (in %), being the discharge capacity at cycle # divided by the initial discharge capacity and multiplied by 100).

As shown in FIG. 7.1—left figure, during the first 200 cycles at 25° C., CEX2, which is a polycrystalline NMC, shows a better cycling stability than EX2. However, after around 1000 cycles, the capacity fading of EX1.1, which is a monolithic NMC having a concentration gradient, becomes less than CEX2's fading. The capacity fading of EX2, which is a monolithic NMC having a concentration gradient and a $Al/LiNaSO_4$ coating layer also becomes much less than that of CEX2 after around 650 cycles. When the battery is tested at 45° C., EX1.1 and EX2 have a clearly better cycling stability than CEX2. As shown in FIG. 7.2, when batteries are tested under a high voltage operating range of 3.0 to 4.35 V, the monolithic NMC (EX1.1 and EX2) shows an improved long-term cycling stability at 25° C. The monolithic NMC (EX2)—having superposed Co-concentration and $Al/LiNaSO_4$ coating layers—has the lowest capacity fading at 45° C. Therefore, the monolithic NMC having a Co-concentration gradient, and preferably provided with an appropriate $Al/LiNaSO_4$ coating layer, is a good candidate for SSBs or non-aqueous batteries, which are operated at high voltage. The same $Al/LiNaSO_4$ coating layer on a polycrystalline material cannot provide the same improvement on cycling behavior in a full cell.

Example 3 and Comparative Example 3

EX3.1 is prepared according to the same method as in EX1.1, except that the mixed transition metal source is $Ni_{0.6}Mn_{0.2}Co_{0.2}O_{0.52}(OH)_{1.48}$, and the Li/M ratio of the final product is set at 0.995 by adapting the quantities of Li and Co precursors in the Co-gradient coating step. By analogy for EX3.2 and EX3.3, Li/M is 1.010 and 1.024 respectively. CEX3.1 is prepared according to the same method as EX3.1 but without the Co-gradient coating step. For CEX3.2 there is a Co-gradient coating step with a final Li/M ratio set at 0.960. The electrochemical performances of EX3.1-3.3 and CEX3.1-3.2 are evaluated using method E3). The initial discharge capacity, irreversibility, rate capability and capacity fading are shown in Table 6.

TABLE 6

Electrochemical properties of Example 3 and Comparative Example 3

| Example ID | Li/M | DQ1 (mAh/g) | $Q_{Irr.}$ (%) | 3C (%) | 1C Qfad. (%) |
|---|---|---|---|---|---|
| EX3.1 | 0.995 | 175.7 | 10.0 | 87.7 | 15.5 |
| EX3.2 | 1.010 | 176.4 | 9.7 | 87.9 | 16.4 |
| EX3.3 | 1.024 | 176.5 | 9.5 | 88.0 | 16.0 |
| CEX3.1 | — | 175.6 | 11.9 | 86.9 | 20.1 |
| CEX3.2 | 0.960 | 172.2 | 11.2 | 85.9 | 16.9 |

As shown in Table 6, NMC products having a concentration gradient exhibit better electrochemical properties than NMC material, which is prepared without a Co-gradient coating. Also, when Li/M in the product is >0.96, and even more when Li/M is at least 0.985, the NMC materials have an improved discharge capacity, irreversibility and cycling stability.

Example 4

A monolithic NC powder, having the formula $Li_{1+a}(Ni_{0.9}Co_{0.1})_{1-a}O_2$, where Li/M is 0.97, is manufactured by the same method as in CEX1.1 but using a precursor $Ni_{0.9}Co_{0.1}O_{0.15}(OH)_{1.85}$ having an average particle size of 3-5 µm. The $1^{st}$ and $2^{nd}$ sintering temperatures are 700° C.

and 860° C. respectively. The final product is labeled EX4.1. EX4.1 is then blended with 5 mol % $Co(NO_3)_2 \cdot 6H_2O$ as a Co coating source, and 5.5 mol % $LiOH \cdot H_2O$ as a lithium source (compared to M in EX4.1) in a tubular mixer for a couple of hours. After that, the prepared blend is heated for 10 hours at about 800° C. in an oxygen containing atmosphere in a chamber furnace. The product is labeled EX4.2, having the formula $Li_{1+a}(Ni_{0.857}Co_{0.143})_{1-a}O_2$, where Li/M is 0.97. The EDS analysis, which is the same method as in EX1, of the EX4.2 indicates it has a decreasing Co-concentration gradient from the surface to the center of the NMC particle. Since EX4.2 does not have Mn in the composition, the normalized Co molar ratio (C(x)) is used to determine the degree of Co gradient. It is obtained by dividing the Co mol % of each position (D1 D4) by the Co mol % on position D0. EX4.2 has a gradient value (C(4)/C(3)) of 1.23.

The electrochemical performance of EX4.1 and EX4.2 is evaluated by method E3). The initial discharge capacity, irreversibility, rate capability and capacity fading of EX4.1 and EX4.2 are shown in Table 7.

TABLE 7

Electrochemical properties of Comparative Example 4

| Example ID | DQ1 (mAh/g) | $Q_{Irr.}$ (%) | 3C (%) | 1C Qfad. (%) |
|---|---|---|---|---|
| EX4.1 | 196.3 | 15.6 | 87.1 | 17.8 |
| EX4.2 | 200.8 | 12.2 | 86.8 | 16.8 |

The initial discharge capacities of EX4.2 & 4.2 are very high because of the high Ni content in the NC composition. When the Co-concentration gradient is applied, the discharge capacity of EX4.2 increases. Therefore, it is proven that monolithic NMCs and NC having the inventive Co-concentration gradient have improved electrochemical properties.

The invention claimed is:

1. A positive electrode active material for a lithium ion battery, comprising a lithium transition metal-based oxide powder, the powder comprising single crystal monolithic particles having a center and a surface and comprising Ni and Co and having a general formula $Li_{1+a}$ $((Ni_z (Ni_{1/2} Mn_{1/2})_y Co_x)_{1-k}A_k)_{1-a}$ $O_2$, wherein A is a dopant, $-0.02<a\leq0.06$, $0.10\leq x\leq0.35$, $0\leq z\leq0.90$, $x+y+z=1$ and $k\leq0.01$, the particles having a cobalt concentration gradient wherein the particle surface has a higher Co content than the particle center and wherein either
when Mn is present, the ratio between the Co/Mn molar ratio at the particle surface and the Co/Mn molar ratio at a distance d from the surface is between 1.1 and 1.3, whereby d=¼ of the distance from the particle surface to the particle center, or
when Mn is absent, the ratio between C(4)/C(3) is between 1.1 and 1.3, wherein C(4) is the ratio between the molar concentration of Co at the particle surface and the molar concentration of Co at the particle center, and wherein C(3) is the ratio between a) the Co molar concentration at ¾ distance from the particle surface to the particle center and b) the molar concentration of Co at the particle center.

2. The positive electrode active material of claim 1, wherein the powder has a particle size distribution with D50<10 μm.

3. The positive electrode active material of claim 1, wherein when Mn is present, the ratio between the Co/Mn molar ratio at the particle surface and the Co/Mn molar ratio at the particle center is between 1.4 and 1.5.

4. The positive electrode active material of claim 1, wherein the cobalt concentration gradient varies continuously from the surface to the center of the particles.

5. The positive electrode active material of claim 1, wherein the particles have a morphology with multiple flat surfaces and an aspect ratio of at least 0.8.

6. The positive electrode active material of claim 1, wherein the particles have a surface layer comprising $LiCoO_2$.

7. The positive electrode active material of claim 1, wherein the particles have a coating comprising either one or both of $LiNaSO_4$ and $Al_2O_3$.

8. A solid state lithium ion battery or a lithium ion battery provided with a liquid electrolyte comprising the positive electrode material of claim 1, wherein the battery is cycled up to a voltage of at least 4.35V.

9. A method for manufacturing the powderous positive electrode material of claim 1, comprising Ni and Co and having a general formula $Li_{1+a}$ $((Ni_z (Ni_{1/2} Mn_{1/2})_y Co_x)_{1-k}A_k)_{1-a}$ $O_2$, wherein A is a dopant, $-0.02<a\leq0.06$, $0.10\leq x\leq0.35$, $0\leq z\leq0.90$, $x+y+z=1$ and $k\leq0.01$, comprising the steps of:
providing a first precursor comprising A, Ni and Co, and Mn, if present in the powderous positive electrode material, the precursor comprising particles having a particle size distribution with a D50<10 μm,
mixing the first precursor with either one of LiOH, $Li_2O$, $Li_2CO_3$ or $LiOH \cdot H_2O$, thereby obtaining a first mixture, wherein the Li to transition metal ratio LM1 in the first mixture is between 0.60 and <1.00,
sintering the first mixture in an oxidizing atmosphere at a temperature between 700° C. and 900° C., for a time between 6 and 36 hrs, thereby obtaining a first intermediate product,
mixing the first intermediate product with either one of LiOH, $Li_2O$, $Li_2CO_3$ or $LiOH \cdot H_2O$ thereby obtaining a second mixture, wherein the Li to transition metal ratio in the second mixture LM2≥0.90,
sintering the second mixture in an oxidizing atmosphere at a temperature between $(950-(155.56*z))°$ C. and $(1050-(155.56*z))°$ C., for a time between 6 and 36 hrs,
milling the sintered second mixture whereby the sintered second mixture particles are separated in solitary primary particles,
providing a Co-based precursor and mixing said Co-based precursors with the sintered and milled second mixture, thereby obtaining a third mixture having a Li to transition metal ratio in the third mixture LM3 with $-0.107*z+1.018\leq LM3\leq-0.107*z+1.098$,
sintering the third mixture in an oxidizing atmosphere at a temperature between 700° C. and 800° C., for a time between 6 and 36 hrs.

10. The method according to claim 9, further comprising in the step of providing a Co-based precursor and mixing said precursors with the sintered and milled second mixture, additionally adding a Li-based precursor.

11. The method according to claim 9, wherein y>0, z≥0.35 and $-0.012\leq a\leq0.010$, LM1 is between 0.60 and 0.95, LM2≥LM1 and LM3≥LM1, and the second sintering temperature is between 895° C. and 995° C.

12. The method according to claim 9, wherein LM3=LM2.

13. The method according to claim 11, wherein between 2 and 10 mol % of Co is added in the Co-based precursor, wherein the mol % Co is expressed versus the total metal content except Li in the second mixture.

14. The method according to claim 9, wherein the milling step is performed using a ball mill equipment, which is applied to break agglomerated powder obtained after sintering the second mixture into separate particles.

15. The method according to claim 9, further comprising the subsequent steps of:
  providing an inorganic oxidizing chemical compound,
  providing a chemical that is a Li-acceptor,
  mixing the sintered third mixture, the oxidizing compound and the Li-acceptor, thereby obtaining a fourth mixture, and
  heating the fourth mixture at a temperature between 300 and 800° C. in an oxygen comprising atmosphere.

16. The method according to claim 15, wherein both the inorganic oxidizing chemical compound and the Li-acceptor chemical are the same compound, being either one of $Li_2S_2O_8$, $H_2S_2O_8$ and $Na_2S_2O_8$, and the heating temperature of the fourth mixture is between 350 and 450° C.

17. The method according to claim 15, wherein a nano-sized $Al_2O_3$ powder is provided as a further Li-acceptor chemical.

* * * * *